United States Patent
Krasner et al.

(10) Patent No.: US 6,298,098 B1
(45) Date of Patent: Oct. 2, 2001

(54) BURST DEMODULATOR FOR USE IN HIGH SPEED BIDIRECTIONAL DIGITAL CABLE TRANSMISSION SYSTEM

(75) Inventors: Norman F. Krasner, San Carlos; Allen Ponsford Edwards, Palo Alto; William G. Xenakis, Pleasanton; Bruce J. Currivan, Los Altos, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/022,467

(22) Filed: Feb. 12, 1998

Related U.S. Application Data

(62) Division of application No. 08/630,085, filed on Apr. 9, 1996, now abandoned.

(51) Int. Cl.[7] .............................. H04L 25/10; H04L 27/06
(52) U.S. Cl. ............................................ 375/317; 375/340
(58) Field of Search ....................................... 375/340, 368, 375/372, 346, 282, 283, 324, 333, 365, 375, 317; 455/5.1, 3.1, 6.1, 6.3, 6.2, 296, 334, 337

(56) References Cited

U.S. PATENT DOCUMENTS 5,553,064 * 9/1996 Paff et al. .............................. 370/50
5,561,469 * 10/1996 Schultz .................................. 348/476

* cited by examiner

Primary Examiner—William Luther
(74) Attorney, Agent, or Firm—Blakely, Sokoloff, Taylor & Zafman LLP

(57) ABSTRACT

A hybrid fiber/coax digital data transmission system in which data from a plurality of subscribers are transmitted upstream to a headend demodulator in a series of data bursts. The headend demodulator acquires and synchronizes a data burst by detecting a BPSK preamble having a repetitive one and zero pattern (10101010101000). The pattern is detected by integrating clock energy in an envelope of a preamble length transmission and using the last three symbols (0,0,0) as a frame marker after differential decoding. Noise in the system is periodically measured by detecting an empty burst placed periodically in the data stream. A first-in, first-out (FIFO) memory allows closer spacing for the data bursts by permitting asynchronous received and output clocks.

18 Claims, 5 Drawing Sheets

BURST DEMODULATOR FOR USE IN HIGH SPEED BIDIRECTIONAL DIGITAL CABLE TRANSMISSION SYSTEM

This application is a divisional application of application Ser. No. 08/630,085, filed Apr. 9, 1996, now abandoned.

BACKGROUND OF THE INVENTION

This invention relates generally to data transmission systems, and more particularly the invention relates to a burst demodulator for use in a high speed bidirectional digital transmission of voice, video, and data.

Much attention is being directed to converting any directional analog data transmission systems, such as the community antenna television (CATV) cable system into a more versatile bidirectional communication system. Today, over 60 million households in the United States enjoy the benefits of cable TV, virtually all of the information which travels into the home over the cable is in the form of analog television signals. Some subscribers now have the ability to send digital signals to select movies or provide other forms of low rate data information from the home to a central location. However, in the next few years the rate of digital information both entering and leaving the home over the CATV cable will increase dramatically. Equally, hybrid fiber/coax (HFC) plants are being installed for telephone/data outside the present CATV systems.

Disclosed in U.S. Pat. No. 5,553,064 by Paff et al. is a cable data transmission system which utilizes time division multiplexing in a downstream direction from a headend unit to multiple subscribers and a time division multiple access transmission from subscribers to the headend unit. The multiple upstream and downstream data channels are shared using different frequency bands. In the downstream, data are broadcast to all subscribers. However, each subscriber is assigned an identification number and a specific carrier frequency for receiving data. The bitstream is continuous using time division multiplexing (TDM) and frequency division duplex (FDD). In the upstream, subscribers send data to the headend in a burst fashion in assigned time slots using time division multiple access (TDMA). A quadrature phase shift keyed (QPSK) modulator is provided for data encoding and modulation for upstream and downstream transmission. In accordance with a feature of the invention claimed therein, a headend burst demodulator is provided for receiving data at the headend from subscribers. A Barker code is utilized in a preamble for data acquisition and synchronization of the data.

The present invention is directed to an improved data preamble and headend demodulator for use therewith which achieve closer spacing of data bursts along with burst acquisition and synchronization.

SUMMARY OF THE INVENTION

In accordance with the invention, a data burst is preceded by a preamble which is a repeating pattern of ones (1) and zeros (0) which is simple to detect and provides a high signal-to-noise ratio at the output of a detector. The repeating pattern is utilized to detect burst signal presence and to measure symbol clock phase without the need for time tracking loop in the demodulator thus reducing demodulator complexity.

In a preferred embodiment, a 14 symbol BPSK preamble has the format 10101010101000. The last three symbols are designed to contrast with the repeating pattern established by the first 12 symbols. The contrasting pattern, when detected, results in the establishment of frame synch.

A feature of the invention is the use of an empty "burst" during which no subscriber transmits, which allows the demodulator to measure background noise power and set an acquisition threshold based on the average noise measurement. This greatly improves the dynamic range of the demodulator.

Another feature of the invention is the use of a first in—first out (FIFO) memory in the demodulator which allows the data bursts to be closely spaced in time. Since the burst demodulator utilizes pipelining in concurrently operating on successive data bursts, which might have different clock phases, the FIFO allows asynchronous input and output clocks.

The invention and objects and features thereof will be more readily apparent from the following description and dependent claims when taken with the drawings.

DETAILED DESCRIPTION OF THE ILLUSTRATIVE EMBODIMENTS

Figure 1:
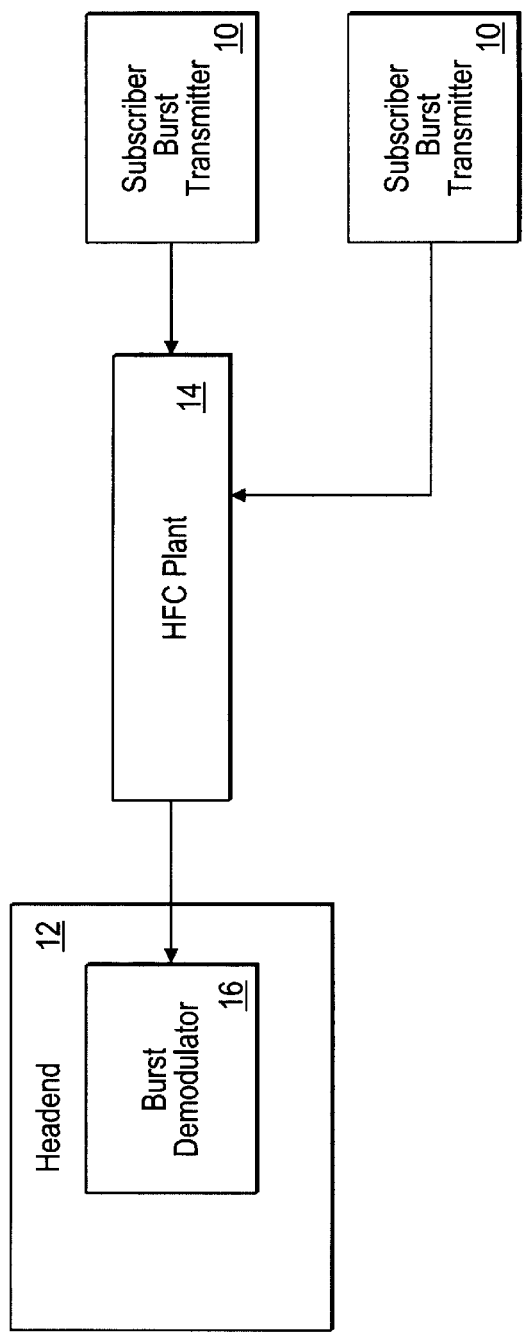
FIG. 1 illustrates a hybrid fiber/coax upstream communication system.

FIG. 1 illustrates the high speed digital transmission of data from a several subscriber burst transmitters 10 to a headend unit 12 over a broad band media such as hybrid fiber/coax (HFC) plant 14 in a cable television or other broadband system. As described in U.S. Pat. No. 5,553,064 by Paff et al., the incoming data signals from the subscribers 10 are transmitted in bursts in several frequency channels. The upstream range is typically between 5–42 MHz. The burst signals are received at the headend 12 by a burst demodulator 16 which detects and synchronizes the headend unit 12 with each data burst.

Figure 2:
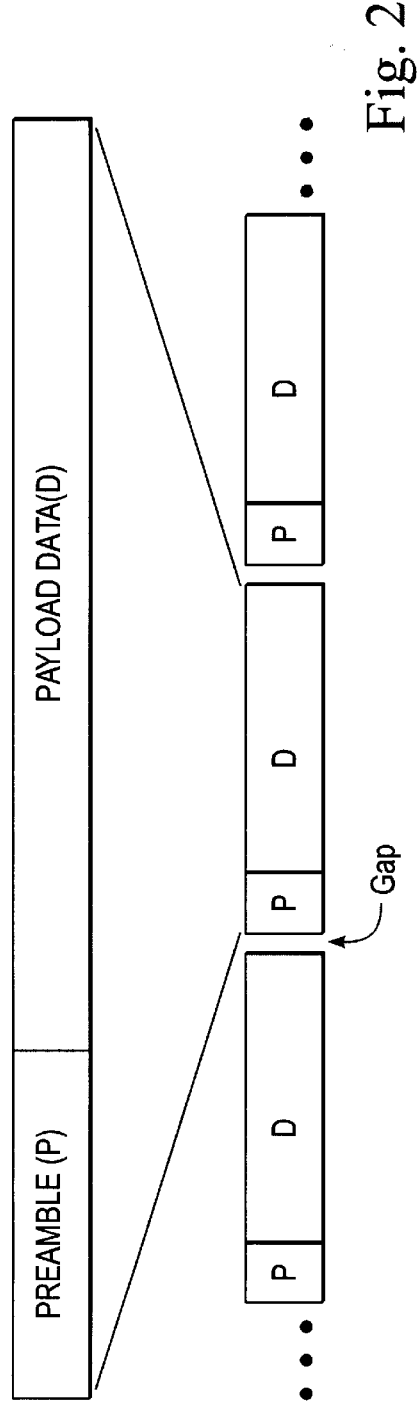
FIG. 2 illustrates a TDMA frame structure showing preamble, data, and interburst gap.

FIG. 2 illustrates TDMA frame structure showing preamble, (P) payload data, (D) and inter burst gap for upstream communication, which is a standard approach in the industry. A given frequency on the channel is shared among several subscribers 10 by assigning each a time slot in which to transmit. Each burst may come from a separate subscriber 16. The headend unit 12 must first determine that a burst is present. Next, synchronization of the clock phase, carrier phase, and data framing must be done on each burst individually. The preamble is normally provided at the beginning of each burst for the purposes of acquisition and synchronization.

Disclosed in U.S. Pat. No. 5,553,064 by Paff et al. is a headend demodulator which operates on a BPSK Barker sequence in the preamble of the data bursts and which employs a matched filter to exploit the Barker sequence. The present invention is a headend demodulator which also utilizes a short BPSK preamble to reduce transmission overhead. By using BPSK, the same data is transmitted on the in-phase (I) and quadrature phase (Q) channels to increase detectability.

Figure 3:
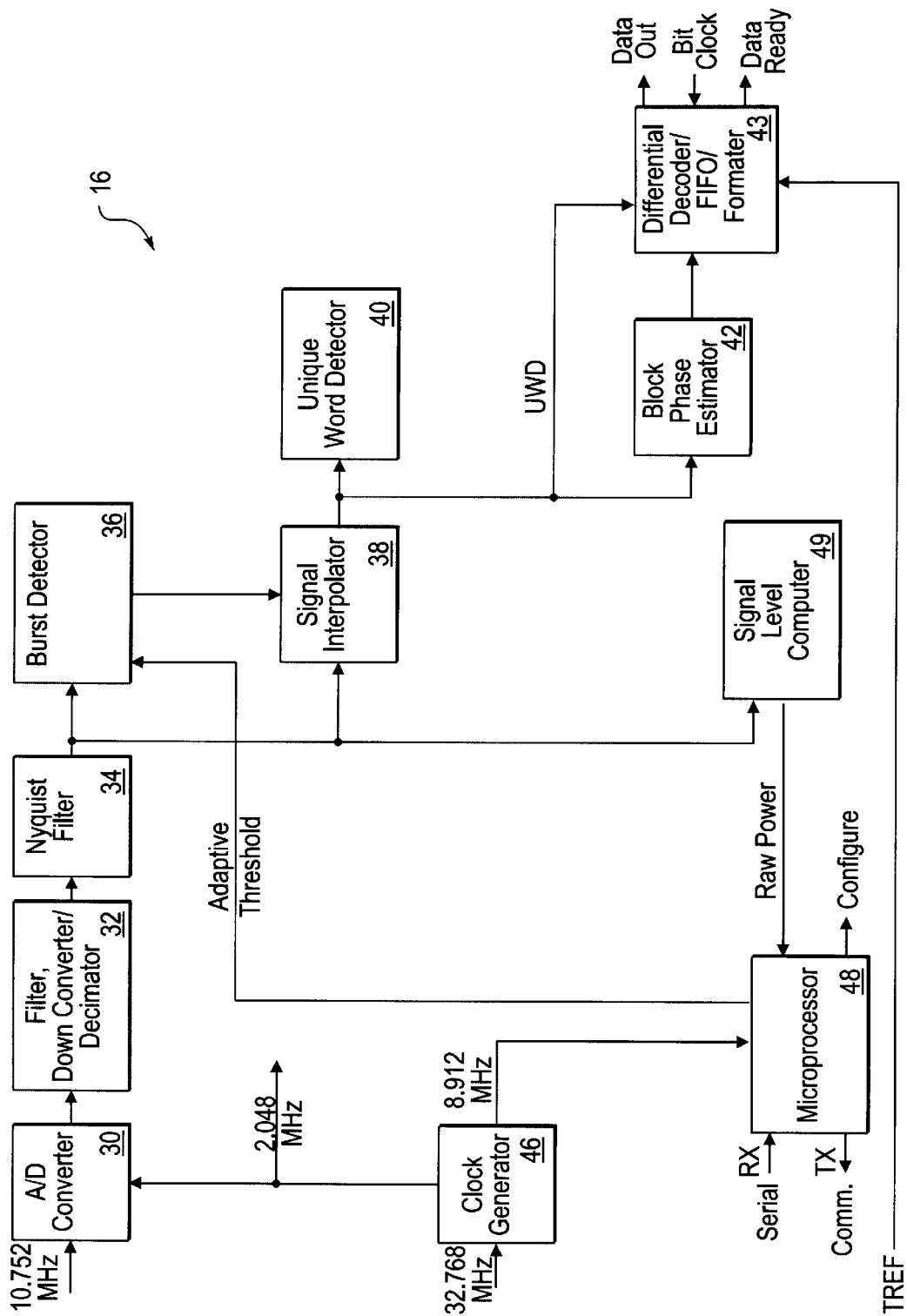
FIG. 3 is a functional block diagram of a demodulator in accordance with the present invention.

In a preferred embodiment of the preamble (P) symbols in the following format are employed: 10101010101000. This pattern is simple to detect in the demodulator 16 and is rich in data transitions, simplifying clock synchronization. The considerable length of the pattern (12 symbols out of the 14 symbols in the preamble) results in high signal-to-noise ratio (SNR) at the output of a burst detector 36 (FIGS. 3 and 4b). The repeating pattern is used for two purposes: (1) to detect burst signal presence, and (2) to measure symbol clock phase. After the clock phase is determined, the phase is frozen and used for the remainder of the burst. This obviates the need for a time tracking loop in the demodulator 16 and greatly reduces demodulator complexity. The last three symbols (000) are designed to contrast with the repeating pattern established by the first 12 symbols. This contrasting pattern, when detected, results in the establishment of frame synchronization.

The demodulator 16 exploits the preamble for signal detection and clock synchronization as follows. The envelope of the received signal contains spectral energy at the symbol clock rate due to the 1010 . . . pattern in the preamble and the bandlimiting effect of the transmit and receive filters. The demodulator 16 computes the envelope (or magnitude) of the received signal and applies a clock-matched filter 28 (FIG. 4b) centered at the symbol clock frequency. An important property of this technique of processing the envelope of the preamble signal, rather than the preamble signal itself, is that the envelope is less sensitive to carrier frequency offset and hence provides a wide frequency acquisition range.

An output of the clock-matched filter 28 is compared to an adaptive threshold (described below) to determine signal presence.

Clock phase is then determined by computing the phase of an out put of the clock matched filter 28. This provides symbol synchronization. The computed clock phase is subsequently used in a polynomial signal interpolator 38 (FIGS. 3 and 4b), to infer the value of the signal between received samples.

The last three symbols (000) of the preamble are a frame marker which is designed to contrast with the repeating pattern established by the first 12 symbols. Differential decoding is used to detect the occurrence of this marker. The differential decoding, which is designed for the preamble BPSK signal, operates as follows: a transition between two successive symbols (e.g., 10 or 01) is decoded as a one, and no transition (00 or 11) is decoded as a zero. During the preamble, the differentially decoded data is all ones, since the repeating pattern (101010 . . . ) contains all transitions. During the frame marker (000) there is no transition, so the differentially decoded data is 00. These two decoded "0" bits contrast with the decoded "1" bits from the preamble. This condition, which is detected by a unique-word detector 40 (FIGS. 3 and 4b) comprised of logic gates, results in the establishment of frame synchronization.

FIG. 3 is a functional block diagram of the digital portion of the headend demodulator 16 in accordance with the invention. A 10.752 MHz analog input signal is converted to digital format by an analog-to-digital converter (A/D) converter 30 and then filtered down converted and decimated by a filter/downconverter/decimator 32 to provide a baseband signal. The baseband signal is applied to a Nyquist filter 34 which is a pulse-matched filter for SNR optimization. The output of the Nyquist filter is passed to a burst detector 36, which detects signal presence and provides synchronization to a signal interpolate 38 which resamples the signal at the optimum clock phase. The unique word detector 40, which provides end-of-burst detection, in a unique word detect (UWD) signal and a block phase estimator (BFE) 42, which removes carrier phase offset, feed into a differential decode/FIFO/formatter 43 which can then operate on the burst data. The block phase estimator (BPE) 42 may use a model Stel-2211 commercially by Stanford Telecommunications Incorporated of Sunnyvale, Calif. Clock signals for operating the demodulator 16 are provided from a 32.768 MHz clock which is divided down to obtain a 2.048 MHz clock and an 8.192 MHz clock by a clock generator 46. The 8.192 MHz clock runs a microprocessor 48 which provides overall control and status, and which computes the adaptive threshold based on a noise measurement.

Figure 4A:
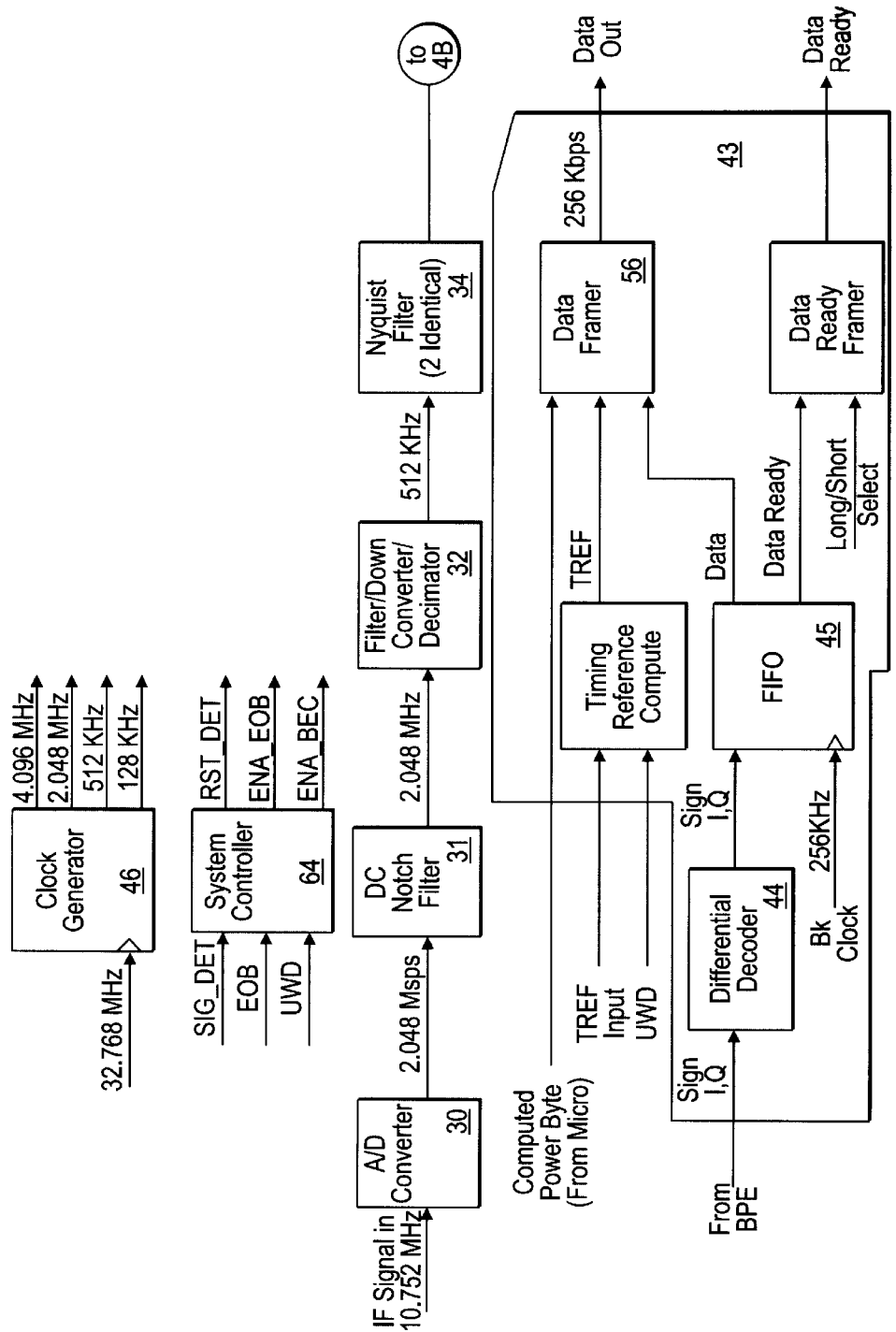
FIGS. 4a and 4b are a more detailed functional block diagram of the demodulator of FIG. 3.
Figure 4B:
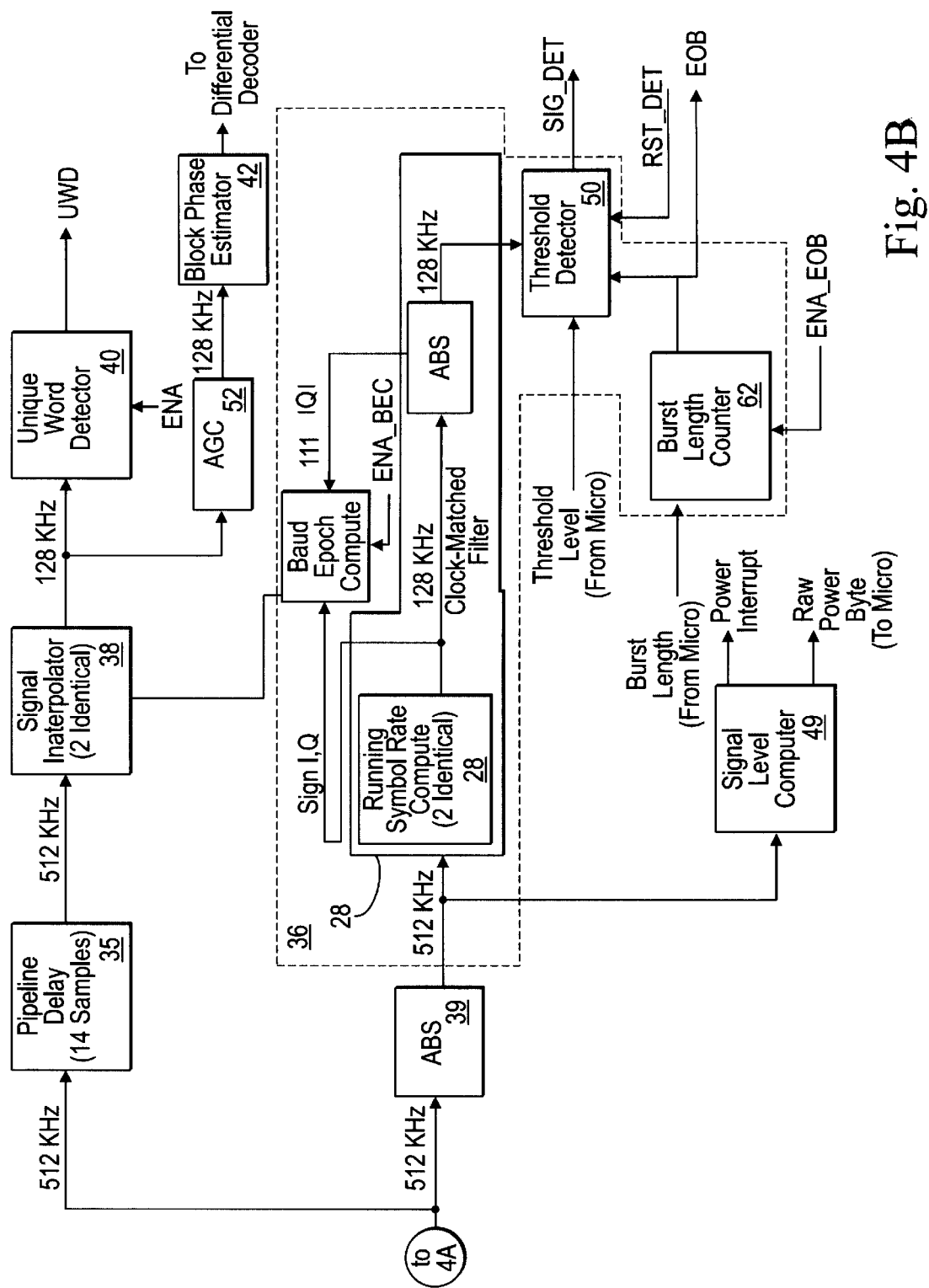

FIGS. 4a and 4b show a more detailed functional block diagram of the demodulator 16 of FIG. 3 with like elements having the same reference numerals. A DC notch filter 31 is connected between the A/D converter 30 and the filter/downconverter/decimator 32, a pipeline delay (14 samples) 35 interconnects the output of Nyquist filter 34 to the signal interpolator 38, and an envelope detector (TBS) 39 connects the output of Nyquist filter 34 to the burst detector 36 and clock-matched filter 28. The clock matched filter 28 provides an output to a threshold detector 50 which the threshold detector 50 compares to a threshold level from the headend microprocessor 48 (FIG. 3) to detect the presence of a signal. The unique word detector 40 comprises logic to detect the differentialy decoded "00" at the end of the preamble. The output of the signal interpolator 38 is passed through an automatic gain control (AGC) 52 to the block phase estimator 42, and the output of the block phase estimator 42 is applied to a differential decoder 44 which applies one input to a FIFO 45. The data output from the FIFO 45 is applied to a data framer 56 which ensures clock and data lineup. The signal level compute block 49 computes the noise level during an empty slot. It outputs the result as "raw power" to the microprocessor 48 (FIG. 3). The microprocessor 48 computes the adaptive threshold from the noise level measurement and sends it as "threshold level" into the threshold detector 50. The threshold detector 50 compares the preamble signal level against the threshold level and provides a signal detect (SIG_DET) signal if a signal is detected. A burst length counter 62 provides an end of burst (EOB) signal to the threshold detector 50 and a system controller 64. The system controller 64 receives the EOB signal, the UWD signal from the unique word detector 40, and the signal detect signal (SIG_DET) from the threshold detector 50; and provides a reset detect (RST_DET) signal to the threshold detector 50, an enable end of burst (ENA_EOB) to the burst length counter 62, and an enable baud epoch compute (ENA_BEC) to the burst detector 36.

Figure 5:
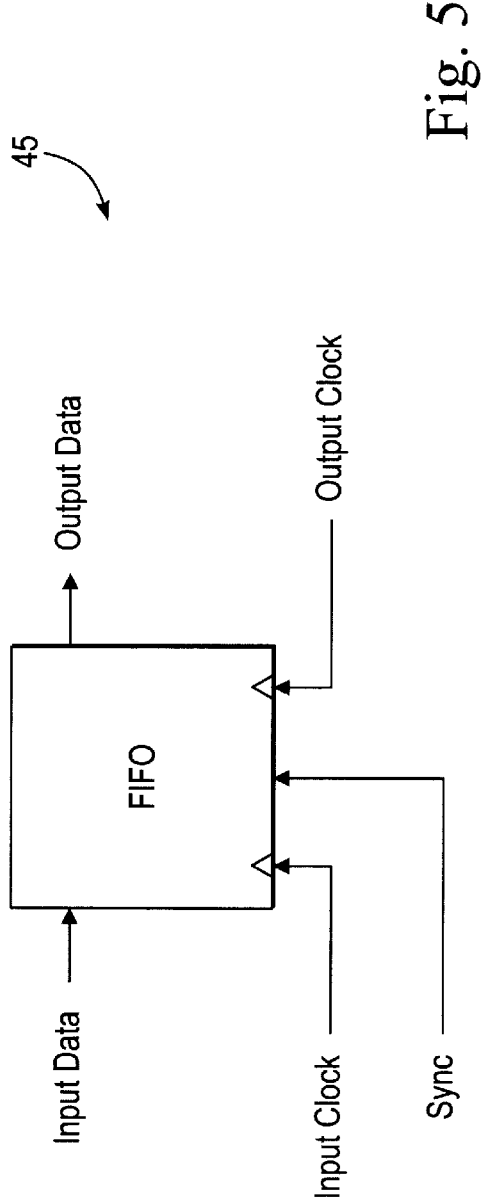
FIG. 5 illustrates a FIFO memory as used in the headend demodulator of FIGS. 4a and 4b.

In accordance with a feature of the invention, the use of the FIFO 45 allows the TDMA bursts to be placed extremely close together in time. Interburst gaps as shown in FIG. 2 as small as two symbols have been successfully implemented. Since burst demodulators as well as most high speed digital systems contain delay elements or "pipelining" to permit time overlapping of signal processing, when a burst arrives data from the previous burst may not have been completely purged from the pipeline, if the interburst gap is smaller than the length of the pipeline. Moreover, the new burst may have a different clock phase from the previous burst thereby causing the system clock to change phase suddenly as it is synchronized to the new burst. The external circuitry accepting the output data may not respond well to a sudden change in clock phase. Use of the FIFO 45 overcomes these concerns. As shown in FIG. 5, data can be written into the FIFO 45 at an input clock while data is output by a separate output clock. The input and output clocks may be asynchronous to each other, subject to constraints which together with the depth of the FIFO 45 (memory size) guarantee that the FIFO 45 does not overflow or underflow. A sync pulse is provided to start the FIFO 45 at the center of its range based on TDMA frame timing. Accordingly, the provision of the FIFO 45 at the output of the burst demodulator 16 allows bursts to be placed extremely close together while maintaining the integrity of the data and the smoothness of the output clock.

Figure 6:
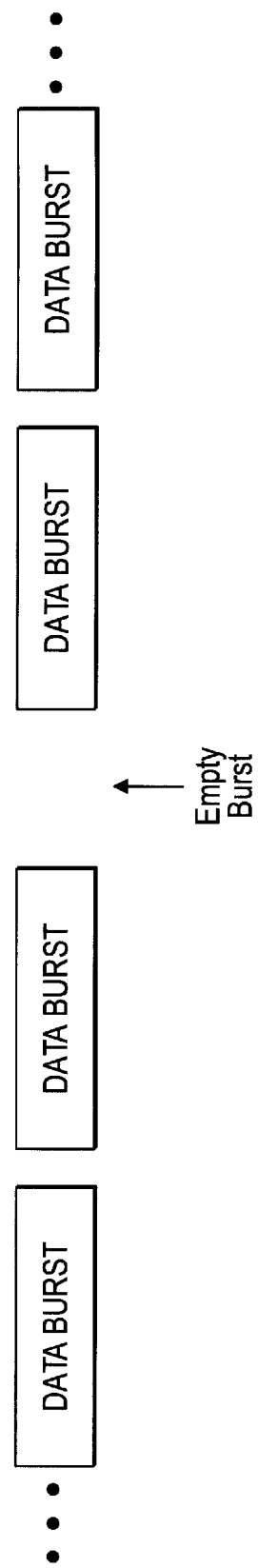
FIG. 6 illustrates the use of an empty data burst for noise measurement as implemented in the demodulator of FIGS. 4a and 4b.

In accordance with another feature of the invention, the dynamic range of the burst demodulator 16 is extended as illustrated in FIG. 6 of the drawing. The stream of TDMA data bursts is designed to contain empty bursts during which no subscriber 10 transmits. During this dead time, the demodulator 16 measures the background noise power and re-sets its acquisition threshold based on the average noise measurement.

A maximum and minimum limit are imposed on the excursion of the adaptive threshold. Between the limits, the threshold is proportional to average measured noise amplitude. The judicious selection of the constant of proportionality and upper limit and lower limit, ensures that the threshold will not fluctuate wildly in the presence of variable noise levels, as is typically found in HFC systems. Filtering of the threshold with adjustable "attack" and "decay" time constants is also useful in some implementations.

Accordingly, the dynamic range of the demodulator 16 is greatly improved by periodically measuring the background noise (which may vary) and resetting the acquisition threshold.

There has been described a headend demodulator for detecting, acquiring and synchronizing data bursts transmitted upstream from a plurality of users, and processing the envelope of a 101010 . . . pattern for clock recovery. The use of a FIFO allows closer spacing of the data bursts through use of asynchronous clocks for inputting and outputting data, and the dynamic range of the demodulator is increased by the periodic measurement of background noise power and resetting acquisition threshold. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A method in a demodulator for receiving an incoming signal having data bursts on a signal line, comprising steps of:
   making a noise measurement on said signal line during an empty time between said data bursts;
   adjusting a threshold based upon said noise measurement;
   measuring a first amplitude on said signal line; and
   detecting a presence of one of said data bursts when said first amplitude is greater than said threshold.

2. The method of claim 1, wherein:
   said threshold is not based upon any measurement representative of an amplitude of said incoming signal during said data bursts.

3. The method of claim 1, wherein:
   the step of measuring said first amplitude includes steps of:
   converting said incoming signal to multi-bit I and Q signals;
   pulse-matched filtering said I and Q signals;
   combining said filtered I and Q signals for providing an envelope signal;
   band pass filtering said envelope signal about a center frequency based upon a symbol rate of said incoming signal for providing a tuned signal; and
   measuring said first amplitude from said tuned signal.

4. The method of claim 3, wherein:
   the step of making a noise measurement includes steps of detecting a presence of said empty time when said first amplitude is less than said threshold;
   measuring a broadband second amplitude of said envelope signal during said empty time; and
   using said second amplitude for said noise measurement.

5. The method of claim 1, wherein:
   said data bursts include a preamble including a repeating pattern of alternating 1's and 0's; and
   said first amplitude is measured from said preamble.

6. The method of claim 1, wherein:
   said threshold is further based upon a computation using a previously determined said threshold and a recent said noise measurement.

7. A burst demodulator for receiving an incoming signal having data bursts on a signal line, comprising:
   a signal detector for measuring a first amplitude on said signal line, detecting a presence of one of said data bursts when said first amplitude is greater than a threshold, and making a noise measurement on said signal line during an empty time between said data bursts;
   a processing circuit coupled to the signal detector for setting said threshold based upon said noise measurement.

8. The demodulator of claim 7, wherein:
   said threshold is not based upon any measurement representative of an amplitude of said incoming signal during said data bursts.

9. The demodulator of claim 7, further including:
   digitizing means for converting said incoming signal to multi-bit I and Q signals;
   an I filter and a Q filter for pulse-matched filtering said I and Q signals, respectively;
   an envelope detector for combining said filtered I and Q signals for providing an envelope signal; and wherein:
   the signal detector includes a burst detector including a tuned filter for band pass filtering said envelope signal about a center frequency based upon a symbol rate of said incoming signal for providing a tuned signal, a first amplitude detector for measuring said first amplitude from said tuned signal, and a threshold detector for comparing said first amplitude to said threshold and issuing a detection signal when said first amplitude is greater than said threshold for indicating said presence of said one of said data bursts.

10. The demodulator of claim 9, wherein:
   the signal detector further includes a signal level computer for measuring a broadband second amplitude of said envelope signal during said empty time;
   said burst detector is further for detecting a presence of said empty time when said first amplitude is less than said threshold; and
   the processor circuit is further for using said second amplitude for said noise measurement.

11. The demodulator of claim 9, wherein:

said data bursts include a preamble including a repeating pattern of alternating 1's and 0's; and said burst detector is further for measuring said first amplitude from said preamble.

12. The demodulator of claim 7, wherein:

said threshold is further based upon a computation using a previously determined said threshold and a recent said noise measurement.

13. A method in a demodulator for receiving an incoming signal having data bursts, comprising steps of:

detecting an amplitude envelope of said incoming signal;

band pass filtering said envelope about a center frequency based upon a symbol rate of said incoming signal for providing a filtered envelope signal;

from said filtered envelope signal measuring a tuned amplitude; and detecting a presence of one of said data bursts when said tuned amplitude is greater than a threshold.

14. The method of claim 13, wherein:

said data bursts include a preamble including a repeating pattern of alternating 1's and 0's; and said tuned amplitude is measured from said preamble.

15. The method of claim 13, further including steps of:

converting said incoming signal to multi-bit quadrature I and Q signals;

pulse-matched filtering said I and Q signals for providing filtered I and Q signals, respectively; and combining said filtered I and Q signals for providing said amplitude envelope.

16. A burst demodulator for receiving an incoming signal having data bursts, comprising:

an envelope detector for detecting an amplitude envelope from said incoming signal;

a filter for band pass filtering said envelope about a center frequency based upon a symbol rate of said incoming signal for providing a filtered envelope signal;

an amplitude detector for measuring a tuned amplitude of said filtered envelope signal; and a threshold detector for detecting a presence of one of said data bursts when said tuned amplitude is greater than a threshold.

17. The demodulator of claim 16, wherein:

said data bursts include a preamble including a repeating pattern of alternating 1's and 0's; and the amplitude detector is further for measuring said tuned amplitude from said preamble.

18. The demodulator of claim 16, further including:

digitizing means for converting a representation of said incoming signal to multi-bit quadrature I and Q signals;

an I and a Q filter for pulse-matched filtering said I and said Q signals and providing filtered I and Q signals, respectively; and wherein:

the envelope detector is further for combining said filtered I and Q signals for providing said amplitude envelope.

* * * * *

UNITED STATES PATENT AND TRADEMARK OFFICE
CERTIFICATE OF CORRECTION

PATENT NO. : 6,298,098 B1  
DATED : October 2, 2001  
INVENTOR(S) : Krasner et al.

Page 1 of 1

It is certified that error appears in the above-identified patent and that said Letters Patent is hereby corrected as shown below:

Drawings,  
Fig. 2, insert the legend -- PRIOR ART --.

Column 2,  
Line 22, after "FIG 2" insert -- (PRIOR ART) --.  
Line 37, delete "from a several" and insert -- from several --.  
Line 48, delete "preamble, (P)" and insert -- preamble (P), --.  
Line 48, delete "payload data, (D)" and insert -- payload data (D), --.  
Line 53, delete "subscriber 16" and insert -- subscriber 10 --.

Column 3,  
Line 67, delete "interpolate 38" and insert -- interpolator 38 --.

Column 4,  
Line 21, delete "(TBS)" and insert -- (ABS) --.  
Line 35, delete "compute" and insert -- computer --.

Signed and Sealed this

Thirtieth Day of July, 2002

Attest:

Attesting Officer

JAMES E. ROGAN  
*Director of the United States Patent and Trademark Office*